United States Patent [19]
Akira et al.

[11] Patent Number: 5,860,579
[45] Date of Patent: Jan. 19, 1999

[54] TRANSFER APPARATUS

[75] Inventors: Toshiro Akira; Ryuichi Iwasaki, both of Wakayama, Japan

[73] Assignee: Noritsu Koki Co., Ltd., Wakayama, Japan

[21] Appl. No.: 804,149

[22] Filed: Feb. 20, 1997

Related U.S. Application Data

[63] Continuation of Ser. No. 419,702, Apr. 11, 1995, abandoned.

[30] Foreign Application Priority Data

Apr. 11, 1994 [JP] Japan .................................. 6-071939

[51] Int. Cl.$^6$ ............................. B65H 23/18; B23Q 15/00
[52] U.S. Cl. ............................................... 226/43; 226/42
[58] Field of Search ........................................ 226/42, 43

[56] References Cited

U.S. PATENT DOCUMENTS

| | | | |
|---|---|---|---|
| 3,165,056 | 1/1965 | Heatley, Jr. et al. | 226/42 |
| 3,452,853 | 7/1969 | Mabon | 226/43 |
| 4,823,163 | 4/1989 | Rollet et al. | 355/41 |

FOREIGN PATENT DOCUMENTS

| | | | |
|---|---|---|---|
| 697601 | 11/1964 | Canada | 226/42 |
| 0 286 548 | 10/1988 | European Pat. Off. | |
| 26 14 965 | 10/1977 | Germany | |
| 60-0258048 | 12/1985 | Japan | 226/42 |
| 4101971 | 4/1992 | Japan | 226/42 |
| 368303 | 3/1932 | United Kingdom | 226/42 |
| 1164114 | 9/1969 | United Kingdom | 226/42 |

OTHER PUBLICATIONS

Patent Abstracts of Japan, vol. 001, No. 103 (E–043), 12 Sep. 1977 & JP–A–52 036025 (Ikegami Tsushinki Co. Ltd.), 19 Mar. 1977, * abstract *.

Primary Examiner—Charles A. Marmor
Assistant Examiner—Matthew A. Kaness
Attorney, Agent, or Firm—Wenderoth, Lind & Ponack, L.L.P.

[57] ABSTRACT

As a negative film having a multiplicity of perforations provided therein at equal intervals is being transferred, its perforations are detected to produce a corresponding pulse signal. The pulse signal is then fed to a controller which in turn calculates the number of clock pulses for each forty pulses of the pulse signal and determines a transfer distance per clock pulse. Meanwhile, the reference transfer distance is obtained from an interval between the perforations multiplied by forty. A difference between the actual transfer distance and the reference transfer distance is calculated and used for controlling the rotating movement of drive rollers.

8 Claims, 2 Drawing Sheets

TRANSFER APPARATUS

This application is a continuation of now abandoned application, Ser. No. 08/419,702, filed Apr. 11, 1995.

BACKGROUND OF THE INVENTION

The present invention relates to a transfer apparatus for conveying a long material, e.g. a photographic film, which has physical markers provided thereon at equal intervals.

In a common transfer apparatus, a long material such as a photographic film is transferred by the rotating action of rollers. The rotating action of the rollers can be controlled with the use of a servo motor or a stepping motor. However, a transfer movement of the long material is not always constant and instead may be varied.

This results from variations in the movement and configuration of the rollers or other components, friction loss between the material and the rollers, and weariness of the rollers and components after a long period of service.

Some of the errors may be eliminated at a manufacturer factory before shipment but the remaining including time-dependent errors should be corrected on site as necessary.

In general, the correction is made by measuring an actual movement of a test piece with a scale, comparing it with a predetermined reference movement to calculate a difference, producing a correction factor from the difference, and correcting the actual movement with the correction factor.

For ease of measuring the actual movement, scores or markings are prepared on the test piece.

The above method of correction however has some disadvantages as explained below.

For the measurement of the actual movement, a test piece of the long material or film has to be subjected to the transfer action which thus increases the consumption of time.

There must be measurement variations of the test piece depending on the precision of the scale or the skill of an operator. This will result in lower accuracy of the correcting action.

As the correction factor is manually calculated by the operator comparing the actual movement with the predetermined reference movement to determine a difference, the overall correcting action will hardly be expedited.

The calculation by the operator may be mistaken thus yielding a fault correct factor.

The correcting of the actual movement to the reference movement using the correction factor is also carried out by a manual control of the apparatus and thus lowers the efficiency.

For the same reason, the correcting of the actual movement may hardly be executed without failure of entry of the correction factor but in perfection.

As the test piece of the long material or film has to be used for the trial measurement, the transfer action declines in efficiency.

As the test piece is provided with scores or markings for the measurement, it will not be substituted with a negative film to be printed.

Above all, the conventional method of correction includes a number of troublesome steps which are not pleased by the operator and will hardly contribute to the efficient operation of the apparatus.

It is an object of the present invention to provide an improved transfer apparatus capable of conveying a long material such as a negative film without the use of a test piece and with no need of manual calculation of a correction factor.

SUMMARY OF THE INVENTION

A transfer apparatus according to the present invention for conveying a long material, e.g. a photographic film, which has physical markers provided thereon at equal intervals, in control with predetermined transfer requirement comprises a detecting means for detecting the physical markers and producing their movement data, a comparing means for comparing the movement data with the predetermined transfer requirement to yield a difference, and a correcting means for correcting the movement of the long material by adjusting the transfer requirement with the difference.

During the transfer movement of the long material, e.g. a photographic film, which has physical markers provided thereon at equal intervals in control with predetermined transfer requirement, a given number of the physical markers are detected by the detecting means which in turn produces a corresponding movement data. The movement data is fed to the comparing means where it is compared with the predetermined transfer requirement thus yielding a difference. For example, if a pulse motor is used as a transfer driving means, the movement data from the physical markers on the long material is translated into a number of clock pulses for the pulse motor in the detecting means. The number of the clock pulses is then compared by the comparing means with a numerical form of the predetermined transfer requirement to determine the difference.

As the correcting means corrects the movement by adjusting the transfer requirement with the difference, the transfer apparatus allows the long material to be transferred to a correct distance.

DETAILED DESCRIPTION OF THE PREFERRED EMBODIMENT

One preferred embodiment of the present invention will be described in the form of a negative film transfer apparatus referring to the accompanying drawings.

Figure 1:
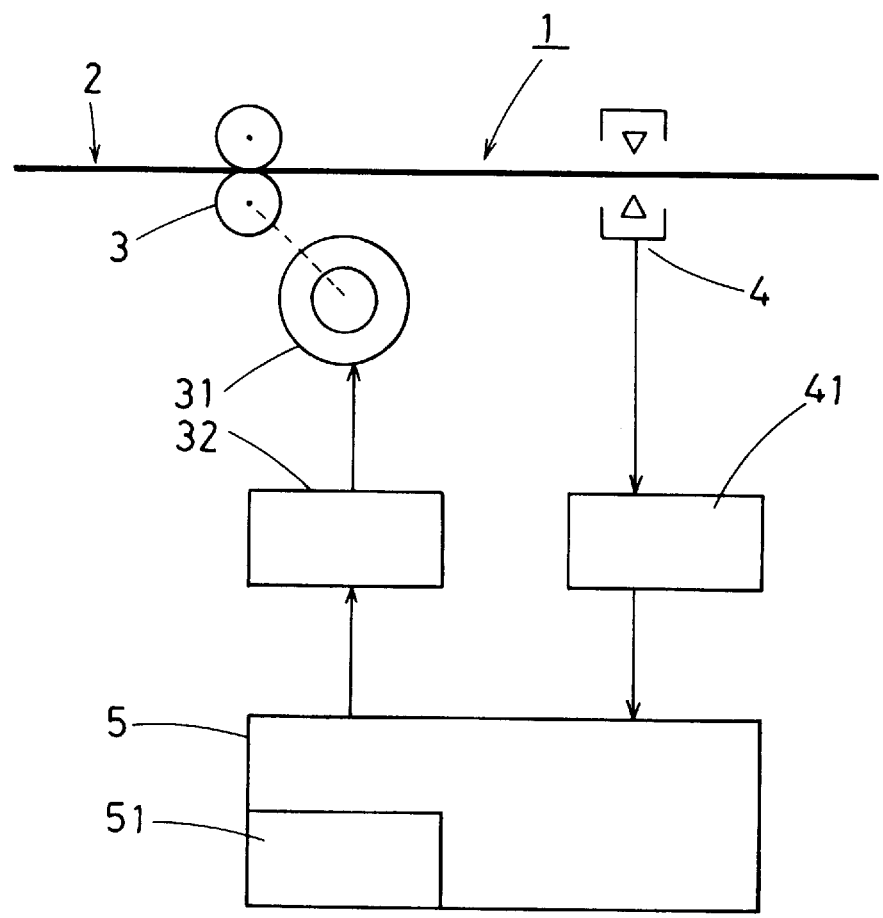
FIG. 1 is a schematic view of a transfer apparatus showing one embodiment of the present invention.
Figure 2:
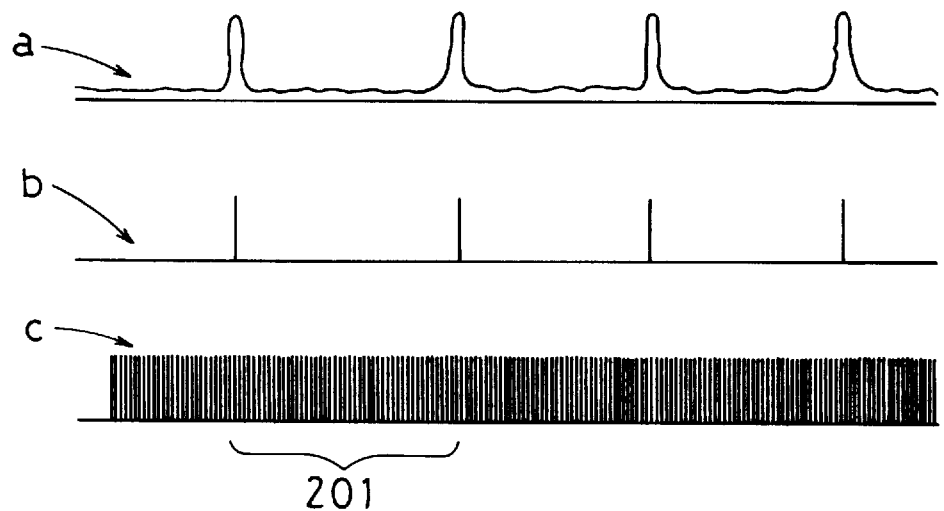
FIG. 2 is an explanatory view showing major signals in the transfer apparatus.
Figure 3:
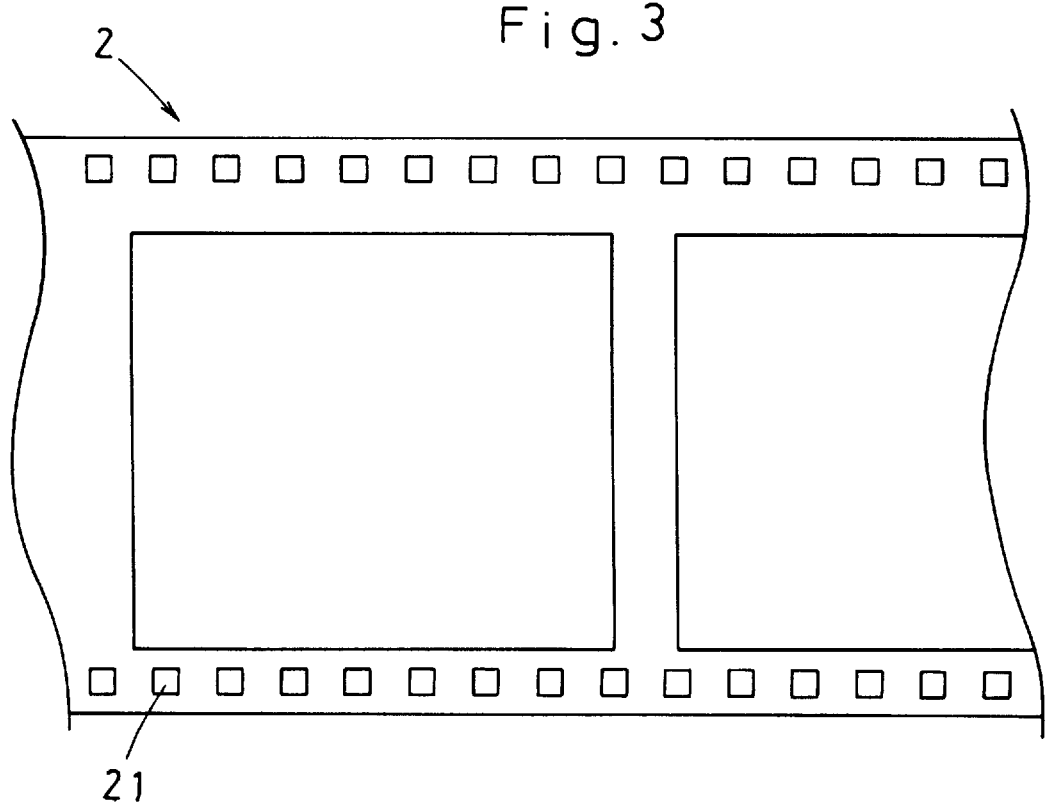
FIG. 3 is a plan view showing the construction of a negative film.

As shown in FIG. 1, the negative film transfer apparatus is denoted by the numeral 1 while a photographic negative film to be conveyed is denoted by 2. The negative film 2 has a multiplicity of perforations 21 arranged at equal intervals therein, as best shown in FIG. 3. A pair of transfer rollers 3 are driven by a drive motor 31, e.g. a servo motor or a pulse motor, for transferring the negative film 2 a given distance. The rotation of the drive motor 31 is controlled by a motor driver 32.

Also, a detecting means 4 is provided for counting a number of the perforations 21 in the negative film 2 and in response, producing a detection signal. The detecting means 4 is electrically connected to a shaper circuit 41 which converts the detection signal by waveshaping to a pulse signal. The detecting means 4 is either an optical or mechanical type of detector or may use ultrasonic waves for detection.

There is provided a controller 5 including a microcomputer. The controller 5 produces a transfer command signal according to reference transfer distance data DO stored in a memory 51 and their correction data ΔD, and delivers it via the motor driver 32 to the drive motor 31 for control of the rotation movement. The controller 5 also calculates the number of pulses V of the pulse signal and compares it with a predetermined reference pulse number Vo to produce a difference ΔV (=V−Vo). It then modifies the correction data ΔD in response to the difference ΔV.

The controller 5 functions as a combination of comparing means and correcting means The action of the transfer apparatus will now be explained assuming that the perforations 21 in the negative film 2 are arranged at equal intervals of F mm and the reference transfer distance is Do.

The transfer rollers 3 are actuated with the transfer command signal produced by the controller 5 according to the reference transfer distance data Do and the correction data ΔD. The initial setting in the apparatus is ΔD=0.

When conditions of the transfer apparatus are perfect, the negative film 2 is conveyed by Do in each transfer movement.

However, due to variations in the movement and configuration of the transfer rollers 3, the reference transfer distance Do may not be achieved in the actual transfer movement.

The detecting means 4 detects the passing of the perforations 21 in the negative film 2 and produces a detection signal a. The detection signal a is transmitted to the shaper circuit 41 where it is wave shaped and further delivered as a pulse signal b. The pulse signal b has a string of pulses corresponding to the number of the perforations 21 in the negative film 2 detected by the detecting means 4.

The interval between two pulses in the pulse signal b is designated as a unit period of a clock pulse signal c for controlling the pulse motor 31. It is now assumed that the number of clock pulses V in the unit period is 200. If 201 of the clock pulses are detected in the actual transfer movement of the negative film 2, the transfer distance per one pulse in the clock signal c of the pulse motor 31 is expressed by 200/201.

In case that the pulse motor 31 is replaced with a servo motor, a desired number of pulses of the clock pulse signal c may be determined by a rotary encoder or the like.

By comparing the actual pulse number V (=201) and the reference pulse number Vo (=200), it is found that not 100% but 99.5% of the transfer distance is effected. More specifically, the difference is −0.5% between the actual distance and the reference distance. For compensation for the difference, a correction factor of 1/0.995=1.005 is necessary. Accordingly, the factor of 1.005 is stored as the correction data ΔD in the memory 51.

The transfer command signal is produced from 1.005 Do which is determined by modifying the reference data Do with the correction data ΔD.

As the result, the actual transfer distance is increased by 0.5% to be equal to the reference transfer distance.

As set forth above, the number of pulses V in the actual transfer movement is detected by the detecting means 4 and compared with the reference pulse number Vo in the controller circuit 5. A resultant difference is then used for correcting the actual transfer distance to a predetermined reference length.

In the embodiment, the interval between two perforations 21 is designated as the unit period of the clock pulse signal c. For increasing the accuracy of detection, the counting of clock pulses between any two perforations 21 may be repeated multiple times.

It is assumed that the number of clock pulses is N when 40 of the perforations 21 have been detected during the transfer movement of the negative film 2. The transfer distance is thus expressed by N×Pmm (where P mm being a transfer movement per clock pulse) which is equal to 40×F mm (F mm being the interval between two perforations). For movement through 40×F mm, the number of clock pulses is in theory expressed by 40×F/P=2420.

It is also established the correction data ΔD=transfer distance (calculated from the clock pulses) / actual transfer distance or the correction data ΔD=the number of actual pulses /2420.

An example will be explained where the transfer distance per clock pulse D is 0.0785 mm and the interval F between two perforations 21 in the negative film 2 is 4.75 mm.

When the passing of 40 of the perforations 21 is represented by 2293 of the clock pulse number N, the actual transfer distance of the negative film 2 is 2293×0.0785=180 mm. As the desired transfer distance is 40×4.75=190 mm, a difference between the actual and the reference is +6% calculated from 190/180=1.06. Accordingly, the correction data ΔD is expressed by 180/190=0.95 and used for correcting to the reference transfer distance Do.

When the passing of 40 of the perforations 21 is represented by 2548 of the clock pulse number N, the actual transfer distance of the negative film 2 is 2548×0.0785=200 mm. A difference between the actual and the reference is thus −5% as calculated from 190/200=0.95. Accordingly, the correction data ΔD is expressed by 200/190=1.05.

As the result, the transfer command signal produced by the correction data ΔD determined from comparison with the reference transfer distance Do is supplied to the motor 31 for correcting the actual transfer distance to the reference transfer distance.

It is understood that the number of the perforations 21 to be detected is not limited to 40.

If the actual transfer distance is not in a range of 180 mm to 200 mm, it may be a fault value and substituted with 190 mm.

As set forth above, the correction of the transfer movement according to the present invention is carried out during a routine of the actions, requiring no extra step. It is systematically executed without the use of manual calculation and handling of an operator and will be free from possible human-related errors.

Accordingly, the transfer apparatus of the present invention is increased in the performance and the operating reliability.

It may be possible that the counting of the clock pulses and the calculation of the correction data in the controller 5 are implemented by an arithmetic processing means such as a microcomputer or a combination of logic circuits.

When the detection signal of the detecting means contains information of the interval between the perforations 21 in the negative film 2, the interval information is translated to the number of clock pulses which is then examined to yield the correction data.

It is also arranged in the embodiment that a corresponding step of the control with the computer is canceled When the negative film 2 has any fault perforation 21 or an injury.

What is claimed is:

1. A photographic film transfer apparatus for conveying a photographic film lengthwise, the photographic film having perforations spaced apart at equal length intervals, said apparatus comprising:

a conveying means for conveying the photographic film;

a detecting means for detecting a passage of each perforation of the photographic film as the photographic film is conveyed by said conveying means and for generating a corresponding detection signal;

a conversion means for converting the detection signal into a corresponding pulse signal having successive detection pulses; and, control means for:

determining a reference number of clock pulses between a predetermined number of successive detection pulses in order to set a reference transfer time necessary to convey the photographic film for a reference transfer distance:

counting an actual number of clock pulses, between said predetermined number of successive detection pulses of said pulse signal in order to calculate an actual transfer time necessary to convey the photographic film for the reference transfer distance;

determining a difference between said actual number of clock pulses and said reference number of clock pulses;

obtaining a transfer speed adjustment amount corresponding to said difference; and adjusting a transfer speed of said conveying means by said transfer speed adjustment amount in order to convey the photographic film for the reference transfer distance in the reference transfer time.

2. A photographic film transfer apparatus as claimed in claim 1, wherein said conveying means includes a servo motor.

3. A photographic film transfer apparatus as claimed in claim 1, wherein said conveying means includes a pulse motor.

4. A photographic film transfer apparatus as claimed in claim 1, wherein said conversion means is a wave-shaping circuit.

5. A photographic film transfer apparatus comprising:

a photographic film having perforations spaced apart at equal length intervals;

a conveying means for conveying the photographic film;

a detecting means for detecting a passage of each perforation of the photographic film as the photographic film is conveyed by said conveying means and for generating a corresponding detection signal;

a conversion means for converting the detection signal into a corresponding pulse signal having successive detection pulses; and, control means for:

determining a reference number of clock pulses between a predetermined number of successive detection pulses in order to set a reference transfer time necessary to convey the photographic film for a reference transfer distance;

counting an actual number of clock pulses, between said predetermined number of successive detection pulses of said pulse signal in order to calculate an actual transfer time necessary to convey the photographic film for the reference transfer distance;

determining a difference between said actual number of clock pulses and said reference number of clock pulses;

obtaining a transfer speed adjustment amount corresponding to said difference; and adjusting a transfer speed of said conveying means by said transfer speed adjustment amount in order to convey the photographic film for the reference transfer distance in the reference transfer time.

6. A photographic film transfer apparatus as claimed in claim 5, wherein said conveying means includes a servo motor.

7. A photographic film transfer apparatus as claimed in claim 5, wherein said conveying means includes a pulse motor.

8. A photographic film transfer apparatus as claimed in claim 5, wherein said conversion means is a wave-shaping circuit.

\* \* \* \* \*